(12) United States Patent
Hendry et al.

(10) Patent No.: US 12,432,366 B2
(45) Date of Patent: *Sep. 30, 2025

(54) WAVEFRONT PARALLEL PROCESSING FOR TILE, BRICK, AND SLICE

(71) Applicant: Huawei Technologies Co., Ltd., Shenzhen (CN)

(72) Inventors: Fnu Hendry, San Diego, CA (US); Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

This patent is subject to a terminal disclaimer.

(21) Appl. No.: 18/544,091

(22) Filed: Dec. 18, 2023

(65) Prior Publication Data

US 2024/0129504 A1   Apr. 18, 2024

Related U.S. Application Data

(63) Continuation of application No. 17/518,234, filed on Nov. 3, 2021, now Pat. No. 11,889,095, which is a
(Continued)

(51) Int. Cl.
*H04N 19/436* (2014.01)
*H04N 19/13* (2014.01)
(Continued)

(52) U.S. Cl.
CPC ........... *H04N 19/436* (2014.11); *H04N 19/13* (2014.11); *H04N 19/174* (2014.11); *H04N 19/196* (2014.11); *H04N 19/96* (2014.11)

(58) Field of Classification Search
CPC .... H04N 19/436; H04N 19/13; H04N 19/174; H04N 19/196; H04N 19/96; H04N 19/176; H04N 19/70; H04N 19/91
See application file for complete search history.

(56) References Cited

U.S. PATENT DOCUMENTS 9,332,259 B2 * 5/2016 Wang ..................... H04N 19/70
10,244,239 B2 * 3/2019 Horowitz ............. H04N 19/139
(Continued)

FOREIGN PATENT DOCUMENTS

CN   104054348 A   9/2014
RU   2612616 C1   3/2017

OTHER PUBLICATIONS

Benjamin Bross et al:"Versatile Video Coding (Draft 6)." Document: JVET-O2001-vE. Joint Video Experts Team (JVET) of ITU-T SG 16 WP 3 and ISO/IEC JTC 1/SC 29/WG 11 15th Meeting: Gothenburg, SE, Jul. 3-12, 2019, total 455 pages.
(Continued)

*Primary Examiner* — Jared Walker
(74) *Attorney, Agent, or Firm* — Conley Rose, P.C

(57) ABSTRACT

A method of decoding includes encountering an end of tile bit with a first value and byte alignment bits in a video bitstream, which indicate that a current coding tree block (CTB) is a last CTB in a tile; encountering an end of CTB row bit with the first value and the byte alignment bits in the video bitstream, which indicate that waveform parallel processing (WPP) is enabled and that the current CTB is the last CTB in a CTB row but not the last CTB in the tile; and reconstructing the plurality of CTBs in the tile based on the end of tile bit with the first value, the end of CTB row bit with the first value, and the byte alignment bits.

20 Claims, 7 Drawing Sheets

Related U.S. Application Data continuation of application No. PCT/US2020/030104, filed on Apr. 27, 2020.

(60) Provisional application No. 62/864,966, filed on Jun. 21, 2019, provisional application No. 62/843,047, filed on May 3, 2019.

(51) Int. Cl.
*H04N 19/174* (2014.01)
*H04N 19/196* (2014.01)
*H04N 19/96* (2014.01)

(56) References Cited

U.S. PATENT DOCUMENTS

| | | | |
|---|---|---|---|
| 2005/0053158 A1 | 3/2005 | Regunathan et al. | |
| 2009/0002379 A1 | 1/2009 | Baeza et al. | |
| 2013/0182774 A1* | 7/2013 | Wang | H04N 19/70 375/240.24 |
| 2013/0182775 A1* | 7/2013 | Wang | H04N 19/70 375/240.24 |
| 2014/0098887 A1 | 4/2014 | Sermadevi et al. | |
| 2014/0219346 A1 | 8/2014 | Ugur et al. | |
| 2014/0376643 A1* | 12/2014 | Hendrry | H04N 19/436 375/240.26 |
| 2015/0055715 A1* | 2/2015 | Hendry | H04N 19/436 375/240.01 |
| 2015/0091921 A1* | 4/2015 | Cote | H04N 19/91 345/522 |
| 2016/0182913 A1* | 6/2016 | Joshi | H04N 19/139 375/240.08 |
| 2019/0058896 A1 | 2/2019 | Huang et al. | |

OTHER PUBLICATIONS

Document: JVET-N1001-v3, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 8 pages.

Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WVG 11 16th Meeting: Geneva, CH, Oct. 1-11, 2019, 8 pages.

Document: JVET-N0857-v1, Wang, Y-K. et al., "AHG12: Signalling for tile and brick partitioning," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.

Pagala, "MUX/DEMUX of HEVC/H. 265 Video Stream with EE-MC V2 Audio Bit Stream and to Achieve Lip Synch," In: Diss. Aug. 2016 (Aug. 2016) Retrieved on Jun. 21, 2020 (Jun. 21, 2020) from <https://rc.library.uta.edu/uta-ir-bitstream/handle/10106/26127/PAGALA-THESIS-2016.pdf?isAllowed=y&sequence=1>, 80 pages.

"Line Transmission of Non-Telephone Signals, Video Codec for Audiovisual Services at p x 64 kbits," ITU-T Recommendation H.261, Mar. 3, 1993, 29 pages.

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Audiovisual and Multimedia Systems Infrastructure of Audiovisual Services—Coding of Moving Video, ITU-T H.263, Jan. 2005, 226 pages.

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Dec. 2016, 664 pages.

Bross, et al., "Versatile Video Coding (Draft 3)," Joint Video Experts Team (JVET) of ITU-T SG 16 WP 3 and ISO/IEC TC 1/SC 29/WG 11, 14th Meeting: Geneva, CH, Mar. 19-27, 2019, JVET-N1001-v1, 350 pages.

Hendry, et al., "AHG12: On end_ of subset_ one bit, end_ of brick one_bit, and byte alignment in the slice data syntax", Joint Video Experts Team (JVET) of ITU-T SG 16 WP 3 and ISO/IEC JTC 1/SC 29/WG 11,15th Meeting: Gothenburg, SE, JVET-O0144-v1, Jul. 3-12, 2019, 2 pages.

Hellman, T., et al., "AHG17: Removal of bricks", Joint Video Experts Team (JVET) of ITU-T SG 16 WP 3 and ISO/IEC JTC 1/SC 29/WG 11, 16th Meeting: Geneva, CH, JVET-P1004-v2, Oct. 1-11, 2019, 9 pages.

Ikai, T., et al., "AHG12: Wavefront processing in a tile group," Joint Video Experts Team (JVET) of ITU-T SG 16 WP 3 and ISO/IEC JTC 1/SC 29/WVG 11,13th Meeting: Marrakech, MA, JVET-M0070, Jan. 9-18, 2019, 3 pages.

\* cited by examiner

WAVEFRONT PARALLEL PROCESSING FOR TILE, BRICK, AND SLICE

CROSS-REFERENCE TO RELATED APPLICATIONS

This application is a continuation of U.S. patent application Ser. No. 17/518,234 filed on Nov. 3, 2021, which is a continuation of International Application No. PCT/US2020/030104 filed on Apr. 27, 2020, which claims the benefit of U.S. Provisional Patent Application No. 62/843,047 filed May 3, 2019, and U.S. Provisional Patent Application No. 62/864,966 filed Jun. 21, 2019, each of which is hereby incorporated by reference.

TECHNICAL FIELD

In general, this disclosure describes techniques supporting wavefront parallel processing (WPP) in video coding. More specifically, this disclosure prevents the unnecessary duplication of bits and byte alignment in WPP.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding a coded video bitstream implemented by a video decoder. The method includes receiving, by the video decoder, the coded video bitstream, wherein the coded video bitstream contains a picture, the picture including one or more slices having one or more tiles, each tile containing a plurality of coding tree blocks (CTBs); encountering, by the video decoder, an end of tile bit with a first value and byte alignment bits in the coded video bitstream when the end of tile bit with the first value is absent from the coded video bitstream, the end of tile bit with the first value and the byte alignment bits indicating that a current CTB from the plurality of CTBs is a last CTB in a tile; encountering, by the video decoder, an end of CTB row bit with the first value and the byte alignment bits in the coded video bitstream, the end of CTB row bit with the first value and the byte alignment bits indicating that waveform parallel processing (WPP) is enabled and that the current CTB from the plurality of CTBs is the last CTB in a CTB row but not the last CTB in the tile; and reconstructing, by the video decoder, the plurality of CTBs in the tile based on the end of tile bit with the first value, the end of CTB row bit with the first value, and the byte alignment bits.

The method provides techniques that prevent the duplication of signaling and byte alignment in WPP. By eliminating the duplication of signaling and byte alignment in WPP, the number of bits used to signal the end of a row/tile and the number of bits used as padding are reduced. By reducing the number of bits needed for WPP, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the end of tile bit is designated end_of_tile_one_bit.

Optionally, in any of the preceding aspects, another implementation of the aspect provides that the end of CTB row bit is designated end_of_subset_bit.

Optionally, in any of the preceding aspects, another implementation of the aspect provides that the WPP is enabled by a flag disposed in a parameter set.

Optionally, in any of the preceding aspects, another implementation of the aspect provides that the WPP is enabled by a flag designated as entropy_coding_sync_enabled_flag.

Optionally, in any of the preceding aspects, another implementation of the aspect provides that the first value is one (1) when the WPP is enabled.

Optionally, in any of the preceding aspects, another implementation of the aspect provides displaying an image generated based on the plurality of CTBs as reconstructed.

A second aspect relates to a method of encoding a video bitstream implemented by a video encoder. The method includes partitioning, by the video encoder, a picture into one or more slices, each slice containing one or more tiles, each tile containing a plurality of coding tree blocks (CTBs); encoding, by the video encoder, an end of tile bit with a first value and byte alignment bits into the video bitstream when a current CTB from the plurality of CTBs is a last CTB in a tile; encoding, by the video encoder, an end of CTB row bit with the first value and byte alignment bits into the video bitstream when waveform parallel processing (WPP) is enabled and when the current CTB is the last CTB in a CTB row but not the last CTB in the tile; and storing, by the video encoder, the video bitstream for transmission toward a video decoder.

The method provides techniques that prevent the duplication of signaling and byte alignment in WPP. By eliminating the duplication of signaling and byte alignment in WPP, the number of bits used to signal the end of a row/tile and the number of bits used as padding are reduced. By reducing the number of bits needed for WPP, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the end of tile bit is designated end_of_tile_one_bit.

Optionally, in any of the preceding aspects, another implementation of the aspect provides that the end of CTB row bit is designated end_of_subset_bit.

Optionally, in any of the preceding aspects, another implementation of the aspect provides that the WPP is enabled by a flag disposed in a parameter set.

Optionally, in any of the preceding aspects, another implementation of the aspect provides that the WPP is enabled by a flag designated as entropy_coding_sync_enabled_flag.

Optionally, in any of the preceding aspects, another implementation of the aspect provides that the first value is one (1) when the WPP is enabled.

Optionally, in any of the preceding aspects, another implementation of the aspect provides transmitting the video bitstream toward the video decoder.

A third aspect relates to a decoding device. The decoding device includes a receiver configured to receive a coded video bitstream; a memory coupled to the receiver, the memory storing instructions; and a processor coupled to the memory, the processor configured to execute the instructions to cause the decoding device to: receive the coded video bitstream, wherein the coded video bitstream contains a picture, the picture including one or more slices having one or more tiles, each tile containing a plurality of coding tree blocks (CTBs); encounter an end of tile bit with a first value and byte alignment bits in the coded video bitstream, the end of tile bit with the first value and the byte alignment bits indicating that a current CTB from the plurality of CTBs is a last CTB in a tile; encounter an end of CTB row bit with the first value and the byte alignment bits in the coded video bitstream, the end of CTB row bit with the first value and the byte alignment bits indicating that waveform parallel processing (WPP) is enabled and that the current CTB from the plurality of CTBs is the last CTB in a CTB row but not the last CTB in the tile; and reconstruct the plurality of CTBs in the tile based on the end of tile bit with the first value, the end of CTB row bit with the first value, and the byte alignment bits.

The decoding device provides techniques that prevent the duplication of signaling and byte alignment in WPP. By eliminating the duplication of signaling and byte alignment in WPP, the number of bits used to signal the end of a row/tile and the number of bits used as padding are reduced. By reducing the number of bits needed for WPP, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the end of tile bit is designated end_of_tile_one_bit, wherein the end of CTB row bit is designated end_of_subset_bit, and the first value is one.

A fourth aspect relates to an encoding device. The encoding device includes a memory containing instructions; a processor coupled to the memory, the processor configured to implement the instructions to cause the encoding device to: partition a picture into one or more slices, each slice containing one or more tiles, each tile containing a plurality of coding tree blocks (CTBs); encode an end of tile bit with a first value and byte alignment bits into the video bitstream when a current CTB from the plurality of CTBs is a last CTB in a tile; encode an end of CTB row bit with the first value and byte alignment bits into the video bitstream when waveform parallel processing (WPP) is enabled and when the current CTB is the last CTB in a CTB row but not the last CTB in the tile; and store the video bitstream for transmission toward a video decoder.

The encoding device provides techniques that prevent the duplication of signaling and byte alignment in WPP. By eliminating the duplication of signaling and byte alignment in WPP, the number of bits used to signal the end of a row/tile and the number of bits used as padding are reduced. By reducing the number of bits needed for WPP, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides encoding device further comprises a transmitter coupled to the processor, the transmitter configured to transmit the video bitstream toward a video decoder.

Optionally, in any of the preceding aspects, another implementation of the aspect provides that the end of tile bit is designated end_of_tile_one_bit, wherein the end of CTB row bit is designated end_of_subset_bit, and the first value is one.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

The coding apparatus provides techniques that prevent the duplication of signaling and byte alignment in WPP. By eliminating the duplication of signaling and byte alignment in WPP, the number of bits used to signal the end of a row/tile and the number of bits used as padding are reduced. By reducing the number of bits needed for WPP, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides a display configured to display an image.

A sixth aspect relates to a system. The system includes an encoder; and a decoder in communication with the encoder, wherein the encoder or the decoder includes the decoding device, the encoding device, or the coding apparatus disclosed herein.

The system provides techniques that prevent the duplication of signaling and byte alignment in WPP. By eliminating the duplication of signaling and byte alignment in WPP, the number of bits used to signal the end of a row/tile and the number of bits used as padding are reduced. By reducing the number of bits needed for WPP, the coder/decoder (a.k.a., "codec") in video coding is improved relative to current codecs. As a practical matter, the improved video coding process offers the user a better user experience when videos are sent, received, and/or viewed.

A seventh aspect relates to a means for coding. The means for coding includes receiving means configured to receive a picture to encode or to receive a bitstream to decode; transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques that prevent the duplication of signaling and byte alignment in WPP. By eliminating the duplication of signaling and byte alignment in WPP, the number of bits used to signal the end of a row/tile and the number of bits used as padding are reduced. By reducing the number of bits needed for WPP, the coder/decoder (a.k.a., "codec") in video coding is improved relative to current codecs. As a practical matter, the improved video coding process offers the user a better user experience when videos are sent, received, and/or viewed.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
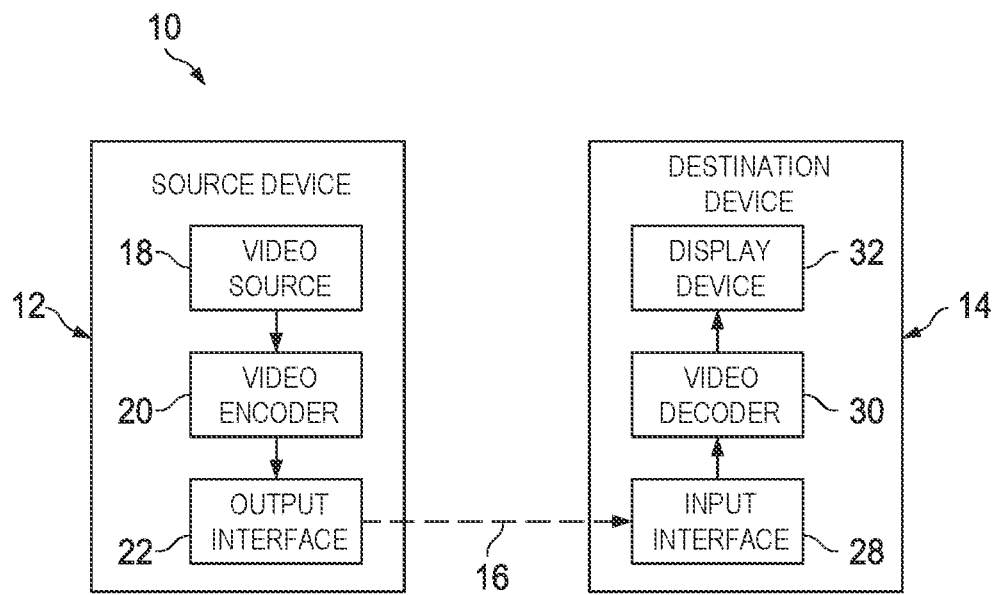
FIG. 1 is a block diagram illustrating an example coding system that may utilize video coding techniques.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is a complete image that is intended for complete or partial display to a user at a corresponding instant in a video sequence. A reference picture is a picture that contains reference samples that can be used when coding other pictures by reference according to inter-prediction. A coded picture is a representation of a picture that is coded according to inter-prediction or intra-prediction, is contained in a single access unit in a bitstream, and contains a complete set of the coding tree units (CTUs) of the picture. A slice is a partition of a picture that contains an integer number of complete tiles or an integer number of consecutive complete CTU rows within a tile of the picture, where the slice and all sub-divisions are exclusively contained in a single network abstraction layer (NAL) unit. A reference slice is a slice of a reference picture that contains reference samples or is used when coding other slices by reference according to inter-prediction. A slice header is a part of a coded slice containing data elements pertaining to all tiles or CTU rows within a tile represented in the slice. An entry point is a bit location in a bitstream containing a first bit of video data for a corresponding subset of a coded slice. An offset is a distance in bits between a known bit location and an entry point. A subset is a sub-division of a set, such as a tile, a CTU row, or CTU. A CTU is a subset of a slice. A coding tree unit (CTU) is a group of samples of a predefined size that can be partitioned by a coding tree. CTUs are divided for each luma/chroma component into coding tree blocks (CTBs). A CTB can be 64×64, 32×32, or 16×16 with a larger pixel block size usually increasing the coding efficiency. CTBs are then divided into one or more coding units (CUs), so that the CTU size is also the largest coding unit size.

A CTU row is a group of CTUs that extend horizontally between a left slice boundary and a right slice boundary. A CTB row is a group of CTBs that extend horizontally between a left slice boundary and a right slice boundary. A CTU column is a group of CTUs that extend vertically between a top slice boundary and a bottom slice boundary. A CTB column is a group of CTBs that extend vertically between a top slice boundary and a bottom slice boundary. An end of CTB row bit is a bit at the end of the CTB row. Byte alignment bits are bits added to the end of a data subset, CTU row, CTB row, tile, etc., as padding. The byte alignment bits may be used to account or compensate for the delay introduced by WPP. WPP is a mechanism of coding CTU rows of a slice with a delay to allow each row to be decoded in parallel by different threads. A slice address is an identifiable location of a slice or sub-portion thereof.

The following acronyms are used herein: Coding Tree Block (CTB), Coding Tree Unit (CTU), Coding Unit (CU), Coded Video Sequence (CVS), Joint Video Experts Team (JVET), Motion-Constrained Tile Set (MCTS), Maximum Transfer Unit (MTU), Network Abstraction Layer (NAL), Picture Order Count (POC), Raw Byte Sequence Payload (RBSP), Sequence Parameter Set (SPS), Sub-Picture Unit (SPU), Versatile Video Coding (VVC), and Working Draft (WD).

FIG. 1 is a block diagram illustrating an example coding system 10 that may utilize video coding techniques as described herein. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of the source device 12 and/or the video decoder 30 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
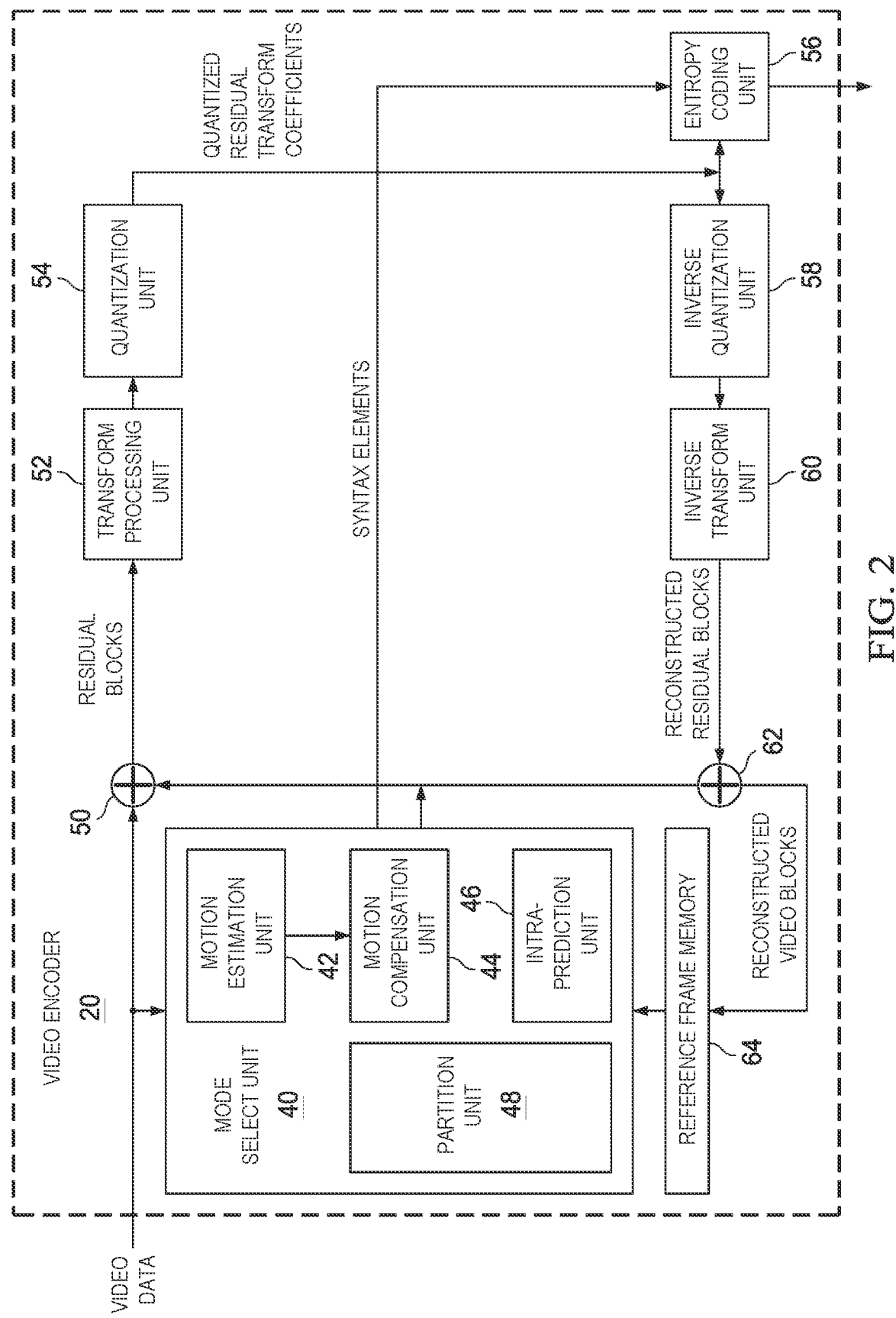
FIG. 2 is a block diagram illustrating an example video encoder that may implement video coding techniques.

FIG. 2 is a block diagram illustrating an example of video encoder 20 that may implement video coding techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., an intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
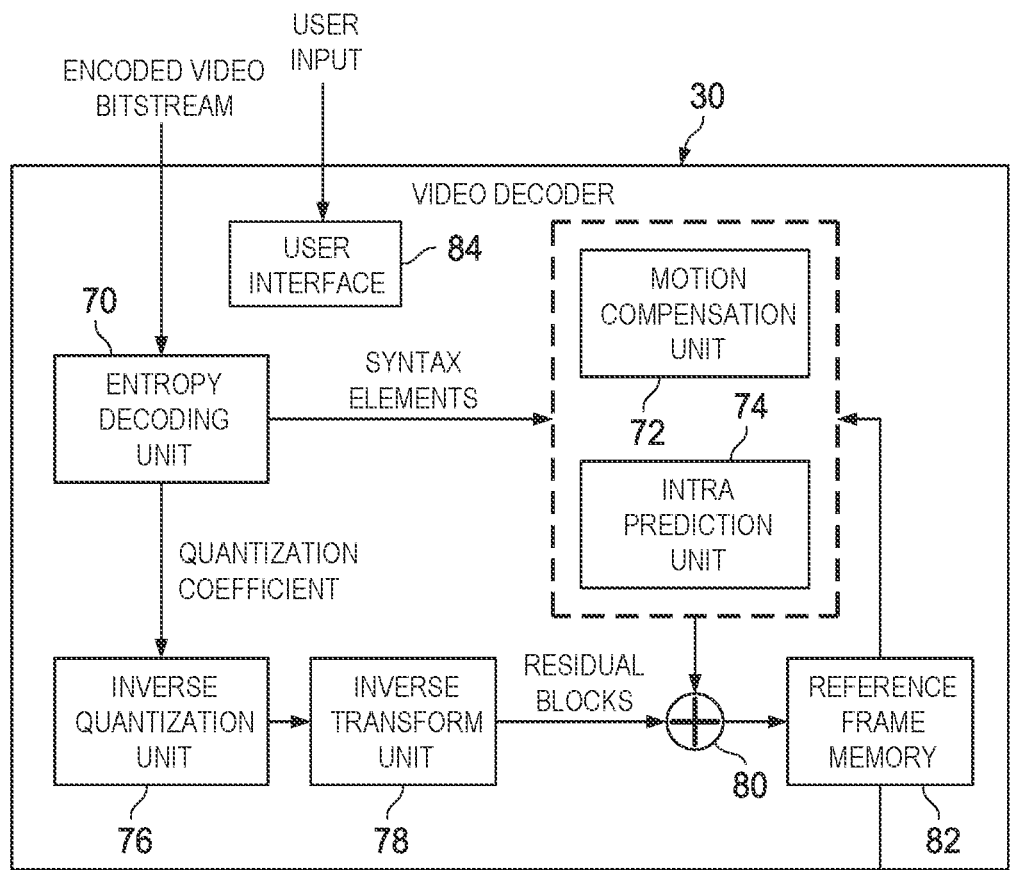
FIG. 3 is a block diagram illustrating an example of a video decoder that may implement video coding techniques.

FIG. 3 is a block diagram illustrating an example of video decoder 30 that may implement video coding techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

In an embodiment, the video decoder 30 includes a user interface (UI) 84. The user interface 84 is configured to receive input from a user of the video decoder 30 (e.g., a network administrator). Through the user interface 84, the user is able to manage or change settings on the video decoder 30. For example, the user is able to input or otherwise provide a value for a parameter (e.g., a flag) in order to control the configuration and/or operation of the video decoder 30 according the user's preference. The user interface 84 may be, for example, a graphical user interface (GUI) that allows a user to interact with the video decoder 30 through graphical icons, drop-down menus, check boxes, and so on. In some cases, the user interface 84 may receive information from the user via a keyboard, a mouse, or other peripheral device. In an embodiment, a user is able to access the user interface 84 via a smart phone, a tablet device, a personal computer located remotely from the video decoder 30, and so on. As used herein, the user interface 84 may be referred to as an external input or an external means.

Keeping the above in mind, video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Image and video compression has experienced rapid growth, leading to various coding standards. Such video coding standards include ITU-T H.261, International Organization for Standardization/International Electrotechnical Commission (ISO/IEC) MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (JVET) of ITU-T and ISO/IEC. While the VVC standard has several working drafts, one Working Draft (WD) of VVC in particular, namely B. Bross, J. Chen, and S. Liu, "Versatile Video Coding (Draft 5)," JVET-N1001-v3, 13th JVET Meeting, Mar. 27, 2019 (VVC Draft 5) is referenced herein.

The description of the techniques disclosed herein are based on the under-development video coding standard Versatile Video Coding (VVC) by the joint video experts team (JVET) of ITU-T and ISO/IEC. However, the techniques also apply to other video codec specifications.

Picture partitioning schemes in HEVC are discussed.

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own network abstraction layer (NAL) unit, and in-picture prediction (intra sample prediction, motion information prediction, coding mode prediction) and entropy coding dependency across slice boundaries are disabled. Thus, a regular slice can be reconstructed independently from other regular slices within the same picture (though there may still be interdependencies due to loop filtering operations).

The regular slice is the only tool that can be used for parallelization that is also available, in a virtually identical form, in H.264/AVC. Regular slice-based parallelization does not employ much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, which is due to the in-picture independence of regular slices and because each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, which provides reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so as to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, when MTU size matching is employed, regular slices can be used with WPP, with certain coding overhead.

Tiles define horizontal and vertical boundaries that partition a picture into tile columns and rows. The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases where a slice is spanning more than one tile, and loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions should be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it should end in the same CTB row.

Picture partitioning schemes in VVC are discussed.

As noted above, HEVC includes four different picture partitioning schemes, namely slices, tiles and bricks, and Wavefront Parallel Processing (WPP), which may be applied for Maximum Transfer Unit (MTU) size matching, parallel processing, and reduced end-to-end delay.

Tiles in VVC are similar to tiles in HEVC. The tiles define horizontal and vertical boundaries that partition a picture into tile columns and rows. In VVC, the concept of tiles is further improved by allowing a tile to be further split horizontally to form bricks. A tile that is not further split is also considered a brick. The scan order of CTBs is changed to be local within a brick (in the order of a CTB raster scan of a brick), before decoding the top-left CTB of the next brick in the order of brick raster scan of a picture.

Slices in VVC comprise one or more bricks. Each slice is encapsulated in its own NAL unit, and in-picture prediction (intra sample prediction, motion information prediction, coding mode prediction) and entropy coding dependency across slice boundaries are disabled. Thus, a regular slice can be reconstructed independently from other regular slices within the same picture (though there may still have inter-dependencies due to loop filtering operations). VVC defines two kinds of slices, which are: rectangular slice and raster scan slice. The rectangular slice comprises one or more bricks that occupy a rectangular region within a picture. The raster scan slice comprises one or more bricks that are in raster scan order of bricks within a picture.

The WPP feature in VVC is similar to the WPP feature in HEVC except that HEVC WPP has a two CTU delay whereas VVC WPP has a one CTU delay. For HEVC WPP, a new decoding thread can start decoding the first CTU in its assigned CTU row after the previous CTU row has its first two CTUs already decoded; on the other hand, for VVC WPP, a new decoding thread can start decoding the first CTU in its assigned CTU row after the previous CTU row has its first CTU already decoded.

The signaling of rectangular slices is discussed.

The structure of rectangular slices is signaled in the picture parameter set (PPS) by describing the number of rectangular slices in a picture. For each slice, a set of top left brick index and a delta value to derive the index of the bottom right brick are signaled to describe the position of the slice in the picture and its size (i.e., in the unit of brick). For a raster scan slice, its information is signaled in the slice header using the index of the first brick in the raster scan slice and the number of bricks in the slice.

The portion of the PPS syntax table shown below includes syntax elements that describe signaling of tiles, bricks, and rectangular slice information in the PPS.

| | Descriptor |
|---|---|
| pic_parameter_set_rbsp( ) { | |
| ... | |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     brick_splitting_present_flag | u(1) |
|     for( i = 0; brick_splitting_present_flag && i < NumTilesInPic; i++ ) { | |
|       brick_split_flag[ i ] | u(1) |
|       if( brick_split_flag[ i ] ) { | |
|         uniform_brick_spacing_flag[ i ] | u(1) |
|         if( uniform_brick_spacing_flag[ i ] ) | |
|           brick_height_minus1[ i ] | ue(v) |
|         else { | |
|           num_brick_rows_minus1[ i ] | ue(v) |
|           for( j = 0; j < num_brick_rows_minus1[ i ]; j++ ) | |
|             brick_row_height_minus1[ i ][ j ] | ue(v) |
|         } | |
|       } | |
|     } | |
|     single_brick_per_slice_flag | u(1) |
|     if( !single_brick_per_slice_flag ) | |
|       rect_slice_flag | u(1) |
|     if( rect_slice_flag && !single_brick_per_slice_flag ) { | |
|       num_slices_in_pic_minus1 | ue(v) |
|       for( i = 0; i <= num_slices_in_pic_minus1; i++ ) { | |
|         if( i > 0 ) | |
|           top_left_brick_idx[ i ] | u(v) |
|         bottom_right_brick_idx_delta[ i ] | u(v) |
|       } | |
|     } | |
|     loop_filter_across_bricks_enabled_flag | u(1) |

|  | Descriptor |
|---|---|
|    if( loop_filter_across_bricks_enabled_flag ) | |
|       loop_filter_across_slices_enabled_flag | u(1) |
|    } | |
|    ... | |
| } | | single_brick_per_slice_flag equal to 1 specifies that each slice that refers to this PPS includes one brick. single_brick_per_slice_flag equal to 0 specifies that a slice that refers to this PPS may include more than one brick. When not present, the value of single_brick_per_slice_flag is inferred to be equal to 1.

rect_slice_flag equal to 0 specifies that bricks within each slice are in raster scan order and the slice information is not signalled in PPS. rect_slice_flag equal to 1 specifies that bricks within each slice cover a rectangular region of the picture and the slice information is signalled in the PPS. When single_brick_per_slice_flag is equal to 1 rect_slice_flag is inferred to be equal to 1.

num_slices_in_pic_minus1 plus 1 specifies the number of slices in each picture referring to the PPS. The value of num_slices_in_pic_minus1 shall be in the range of 0 to NumBricksInPic−1, inclusive. When not present and single_brick_per_slice_flag is equal to 1, the value of num_slices_in_pic_minus1 is inferred to be equal to NumBricksInPic−1.

top_left_brick_idx[i] specifies the brick index of the brick located at the top-left corner of the i-th slice. The value of top_left_brick_idx[i] shall not be equal to the value of top_left_brick_idx[j] for any i not equal to j. When not present, the value of top_left_brick_idx[i] is inferred to be equal to i. The length of the top_left_brick_idx[i] syntax element is Ceil(Log 2(NumBricksInPic) bits.

bottom_right_brick_idx_delta[i] specifies the difference between the brick index of the brick located at the bottom-right corner of the i-th slice and top_left_brick_idx[i]. When single_brickper_slice_flag is equal to 1, the value of bottom_right_brick_idx_delta[i] is inferred to be equal to 0. The length of the bottom_right_brick_idx_delta[i] syntax element is Ceil(Log 2(NumBricksInPic−top_left_brick_idx[i])) bits.

It is a requirement of bitstream conformance that a slice shall include either a number of complete tiles or only a consecutive sequence of complete bricks of one tile.

The variable NumBricksInSlice[i] and BricksToSliceMap[j], which specify the number of bricks in the i-th slice and the mapping of bricks to slices, are derived as follows:

```
NumBricksInSlice[ i ] = 0
botRightBkIdx = top_left_brick_idx[ i ] + bottom_right_brick_idx_delta[ i ]
for( j = 0; j < NumBricksInPic; j++) {
  if( BrickColBd[ j ] >= BrickColBd[ top_left_brick_idx[ i ] ] &&
      BrickColBd[ j ] <= BrickColBd[ botRightBkIdx ] &&
      BrickRowBd[ j ] >= BrickRowBd[ top_left_brick_idx[ i ] ] &&      (7-35)
      BrickRowBd[ j ] <= BrickColBd[ botRightBkIdx ] ) {
    NumBricksInSlice[ i ]++
    BricksToSliceMap[ j ] = i
  }
}
...
```

The signaling of WPP in VVC is discussed.

The signaling method for WPP in VVC is described in the syntax table and the semantics of the PPS, the slice header, and the slice data.

A flag in the PPS called entropy_coding_sync_enabled_flag specifies whether WPP is used for coding of pictures that refer to the PPS as shown in the portion of the PPS syntax table below.

|  | Descriptor |
|---|---|
| pic_parameter_set_rbsp( ) { | |
|   ... | |
|   entropy_coding_sync_enabled_flag | u(1) |
|   ... | |
| } | |

When WPP is enabled for coding of a picture, the slice header of all slices of the picture includes information about the entry point (i.e., offset from the beginning of the slice payload data). The entry point is used to access each subset of the CTU row for processing according to WPP method. This information is signaled as shown in the portion of the slice header syntax table below.

|  | Descriptor |
|---|---|
| slice_header( ) { | |
|   ... | ue(v) |
|   if ( entropy_coding_sync_enabled_flag ) | |
|     num_entry_point_offsets | ue(v) |
|   if( NumEntryPoints > 0 ) { | |
|     offset_len_minus1 | ue(v) |
|     for( i = 0; i < NumEntryPoints; i++ ) | |
|       entry_point_offset_minus1[ i ] | u(v) |
|   } | |
|   byte_alignment( ) | |
| } | |

When WPP is enabled, each CTU row is referred to as a data subset within the slice data payload. At the end of each data subset, a bit designated end_of_subset_one_bit is signaled to indicate the end of the data subset. Furthermore, to ensure that the size of the data subset is a multiple of a byte (i.e., 8 bits), byte alignment is performed to add byte alignment bits at the end of each data subset. The signaling of the end_of_subset_one_bit and the byte alignment at the end of each subset is shown in slice data syntax table below.

|  | Descriptor |
|---|---|
| slice_data( ) { | |
|   for( i = 0; i < NumBricksInCurrSlice; i++ ) { | |
|     CtbAddrInBs = FirstCtbAddrBs[ SliceBrickIdx[ i ] ] | |
|     for( j = 0; j < NumCtusInBrick[ SliceBrickIdx[ i ] ]; j++, CtbAddrInBs++ ) { | |
|       if( ( j % BrickWidth[ SliceBrickIdx[ i ] ] ) = = 0 ) { | |
|         NumHmvpCand = 0 | |
|         NumHmvpIbcCand = 0 | |
|       } | |
|       CtbAddrInRs = CtbAddrBsToRs[ CtbAddrInBs ] | |
|       coding_tree_unit( ) | |
|       if( entropy_coding_sync_enabled_flag && | |
|         ( ( j + 1 ) % BrickWidth[ SliceBrickIdx[ i ] ] == 0 ) ) { | |
|         end_of_subset_one_bit /* equal to 1 */ | ae(v) |
|         if( j < NumCtusInBrick[ SliceBrickIdx[ i ] ] − 1 ) | |
|           byte_alignment( ) | |
|       } | |
|     if( !entropy_coding_sync_enabled_flag ) { | |
|       end_of_brick_one_bit /* equal to 1 */ | ae(v) |
|       if( i < NumBricksInCurrSlice − 1 ) | |
|         byte_alignment( ) | |
|     } | |
|   } | |
| } | |

Some of the problems with WPP and bricks are discussed.

First, when a slice contains multiple bricks and W/PP is enabled for coding of the picture that contains the slice, each CTU row of each brick within the slice is a data subset. At the end of each data subset, either the syntax element end_of_subet_one_bit is signaled to indicate the end of the CTU row or the syntax element end_of_brick_one_bit is signaled to indicate the end of the CTU of the brick. However, it is not necessary to signal both syntax elements. Likewise, at the end of each data subset, byte alignment should be present but there is no need to duplicate it.

When tiles, bricks, and WPP are used together, considering that a slice may contain one or more tiles and each tile may contain one or more bricks, the implementation of WPP may be more complicated.

In order to solve the problems described above, the present disclosure provides the following aspects (each of them can be applied individually and some of them can be applied in combination).

The first solution includes a method for decoding a video bitstream. In an embodiment, the video bitstream comprises at least one picture containing a plurality of slices, each slice of the plurality of slices comprises a plurality of bricks, and each brick of the plurality of bricks comprises a plurality of coding tree blocks (CTUs). The method includes parsing a parameter set to determine whether wavefront parallel processing is enabled for the current picture and/or for the current slice. The method includes parsing slice data of the current slice to obtain bricks and CTUs within each brick. The method further includes parsing the current CTU, which is within the brick; and determining the position of the current CTU. In addition, the method includes signaling a bit to indicate the end of the CTU row and signaling byte alignment bits when the all of the following conditions are satisfied: WPP is enabled for the coding of the current slice, the current CTU is not the last CTU of the current brick; and the next CTU in decoding order of the brick is not the first CTU of a CTU row within the current brick. The method includes signaling a bit to indicate the end of brick when the current CTU is the last CTU in the current brick, and signaling byte alignment bits when the current brick is the last CTU in the current brick but not the last CTU of the current slice.

The second solution includes a method for encoding a video bitstream. The video bitstream comprises at least one picture containing a plurality of slices, each slice of the plurality of slices comprising a plurality of tiles and bricks, and each tile comprising one or a plurality of bricks. The method comprises constraining each slice of the current picture to contain only one tile and each tile to contain only one brick when WPP is enabled for encoding the current picture.

An alternative second solution includes a method for encoding a video bitstream. The video bitstream comprises at least one picture containing a plurality of slices, each slice of the plurality of slices comprising a plurality of tiles and bricks, and each tile comprising one or a plurality of bricks. The method comprises constraining each tile of the current picture to contain only one brick when WPP is enabled for encoding of the current picture. That is, when the value of the entropy_coding_sync_enabled_flag is equal to 1, the value of the brick_splitting_present_flag shall be equal to 0.

An alternative second solution includes a method for encoding a video bitstream. The video bitstream comprises at least one picture containing a plurality of slices, each slice of the plurality of slices comprising a plurality of tiles and bricks, and each tile comprising one or a plurality of bricks. The method comprises constraining each slice of the current picture to contain only one brick when WPP is enabled for encoding of the current picture. That is, when the value of entropy_coding_sync_enabled_flag is equal to 1, the value of variabled NumBricksInCurrSlice shall be equal to 1.

Figure 4:
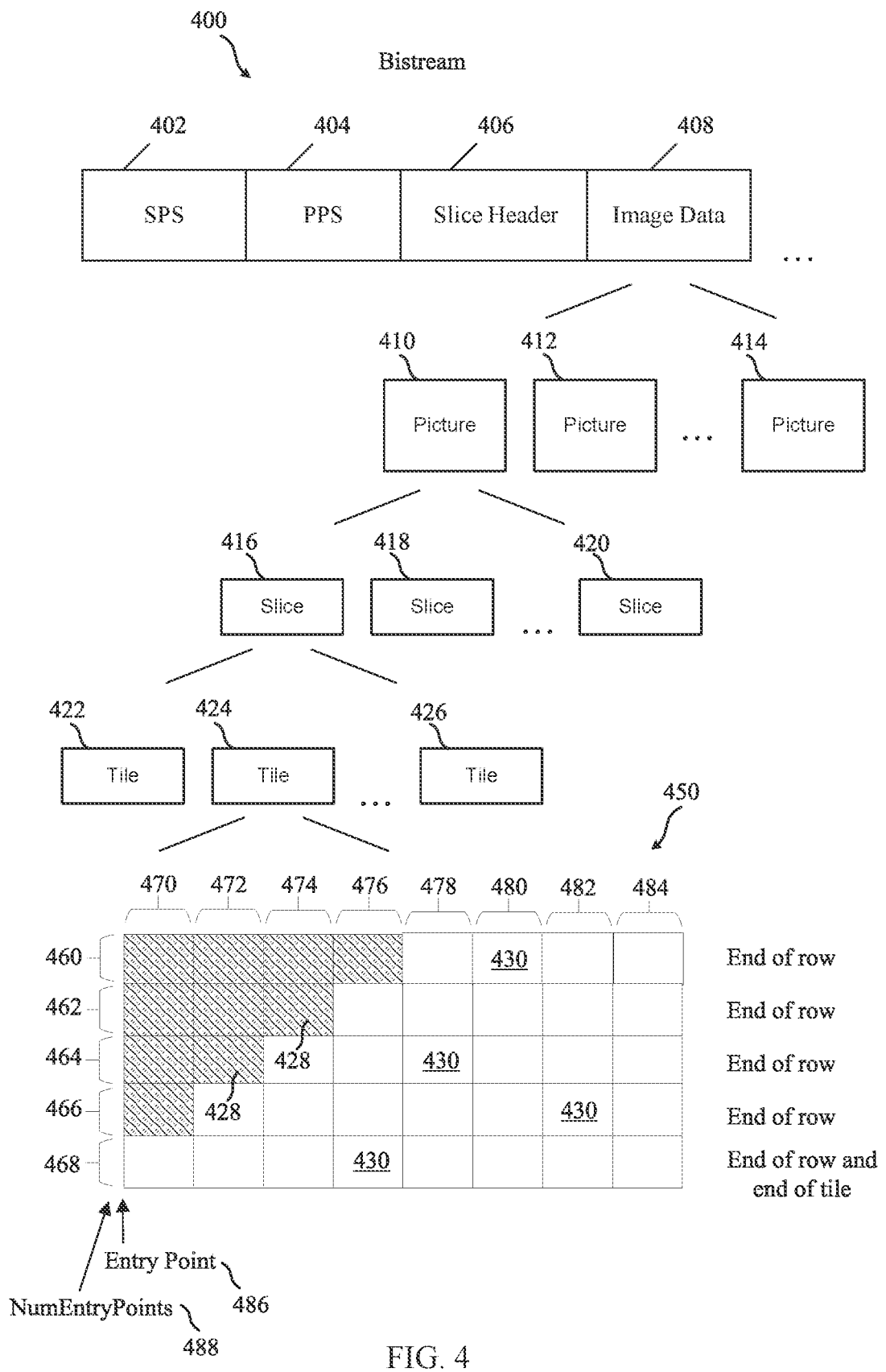
FIG. 4 illustrates a video bitstream configured to implement wavefront parallel processing.

FIG. 4 illustrates a video bitstream 400 configured to implement WPP 450. As used herein the video bitstream 400 may also be referred to as a coded video bitstream, a bitstream, or variations thereof. As shown in FIG. 4, bitstream 400 comprises a sequence parameter set (SPS) 402, a picture parameter set (PPS) 404, a slice header 406, and image data 408.

The SPS 402 contains data that is common to all the pictures in a sequence of pictures (SOP). In contrast, the PPS 404 contains data that is common to the entire picture. The slice header 406 contains information about the current slice such as, for example, the slice type, which of the reference pictures will be used, and so on. The SPS 402 and the PPS 404 may be generically referred to as a parameter set. The SPS 402, the PPS 404, and the slice header 406 are types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important header data that can apply to a large number of VCL NAL units) and supplemental enhancement information (timing information and other supplemental data that may enhance usability of the decoded video signal but are not necessary for decoding the values of the samples in the video pictures). Those skilled in the art will appreciate that the bitstream 400 may contain other parameters and information in practical applications.

The image data 408 of FIG. 4 comprises data associated with the images or video being encoded or decoded. The image data 408 may be simply referred to as the payload or data being carried in the bitstream 400. The image data 408 may be partitioned into one or more pictures, such as picture 410, picture 412, and picture 414. While three pictures 410-414 are shown in FIG. 4, more or fewer pictures may be present in practical applications.

In an embodiment, the pictures 410-414 are each partitioned into slices, such as slice 416, slice 418, and slice 420. While three slices (e.g., slices 416-420) are shown, more or fewer slices may be present in practical applications. In an embodiment, the slices 416-420 are each partitioned into tiles, such as tile 422, tile 424, and tile 426. While three tiles (e.g., tiles 422-426) are shown, more or fewer tiles may be present in practical applications. In an embodiment, the tiles 422-426 are each partitioned into CTBs, such as CTB 428 and CTB 430. While forty CTBs (e.g., CTB 428-430) are shown, more or fewer CTBs may be present in practical applications.

WPP 450 may be employed to encode and/or decode a slice (e.g., slice 416-420). As such, WPP 450 may be employed by an encoder (e.g., video encoder 20) or a decoder (e.g., video decoder 30).

In an embodiment, WPP 450 is applied to tile 424, which is a partition of slice 416, which is a partition of picture 410. The tile contains a plurality of CTBs, such as CTB 428 and CTB 430. Each CTB (e.g., CTB 428-430) is a group of samples of a predefined size that can be partitioned into coding blocks by a coding tree. The plurality of CTBs 428 and the plurality of CTBs 430 may be arranged into CTB rows 460, 462, 464, 466, and 468 and CTB columns 470, 472, 474, 476, 478, 480, 482, and 484. A CTB row 460-468 is a group of CTBs 428-430 that extend horizontally between a left boundary of the tile 424 and a right boundary of the tile 424. A CTB column 470-484 is a group of CTBs 428-430 that extend vertically between a top boundary of the tile 424 and a bottom boundary of the tile 424. In an embodiment, WPP 450 is applied to a slice (e.g., slice 416) instead of a tile (e.g., 424). That is, tiles are optional in some embodiments.

WPP 450 may employ multiple computing threads operating in parallel to code CTBs 428-430. In the example shown, CTBs 428 (shaded) have been coded while CTBs 430 (not shaded) have not been coded yet. For example, a first thread may begin coding CTB row 460 at a first time. In VVC, once one CTB 428 has been coded in the first CTB row 460, a second thread may begin coding CTB row 462. Once one CTB 428 has been coded in the second CTB row 462, a third thread may begin coding CTB row 464. Once a CTB 428 has been coded in the third CTB row 464, a fourth thread may begin coding CTB row 466. Once one CTB 428 has been coded in the fourth CTB row 466, a fifth thread may begin coding a fifth CTB row 468. This results in the pattern as shown in FIG. 4. Additional threads may be employed as desired. That is, the process of starting a new CTB row after a CTB in a previous row had been coded may be repeated. This mechanism creates a pattern with a wavefront-like appearance, and hence the name WPP 450. Some video coding mechanisms code a current CTB 430 based on a coded CTB 428 positioned above or to the left of the of the current CTB 430. In VVC, WPP 450 leaves a one CTB 430 coding delay between initiating each thread to ensure such CTBs 428 have already been coded upon reaching any current CTB 430 to be coded. In HEVC, WPP 450 leaves a two CTB 430 coding delay between initiating each thread to ensure such CTBs 428 have already been coded upon reaching any current CTB 430 to be coded.

The CTBs 428 are coded into a bitstream (e.g., bitstream 400) in CTB rows 460-468. Accordingly, each CTB row 460-468 may be an independently addressable subset of the tile 424 in the bitstream 400. For example, each CTB row 460-468 can be addressed at an entry point 486. An entry point 486 is a bit location in the bitstream 400 containing a first bit of video data for a corresponding subset of the tile 424 after the tile 424 is encoded. When WPP 450 is employed, the entry point 486 is the bit location containing the first bit of the corresponding CTB row 460-468. As such, a number of entry points (NumEntryPoints) 488 is a number of the entry points 486 for the CTB rows 460-468.

Using the tile 424 in FIG. 4 as an example, an encoder adds an end of CTB row bit at the end of each CTB row 460-468 in WPP. The end of CTB row bit signals the end of the CTB row 460-468 to the decoder. The encoder then performs byte alignment to add byte alignment bits as padding. In addition, the encoder also adds an end of tile bit at the end of CTB row 468 in WPP. The end of tile bit signals the end of the tile 424 to the decoder. The encoder then performs byte alignment to add byte alignment bits as padding. Because the end of the CTB row 468 is also the end of the tile 424, the encoder in WPP encodes the end of CTB row bit and the end of tile bit after the last CTB 430 in CTB row 468 has been coded and performs byte alignment twice. Thus, there is duplication of signaling and byte alignment in WPP.

Disclosed herein are techniques that prevent the duplication of signaling and byte alignment in WPP. By eliminating the duplication of signaling and byte alignment in WPP, the number of bits used to signal the end of a tile and the number of bits used as padding are reduced. By reducing the number of bits needed for WPP, the coder/decoder (a.k.a., "codec") in video coding is improved relative to current codecs. As a practical matter, the improved video coding process offers the user a better user experience when videos are sent, received, and/or viewed.

Unlike the WPP described above, the present disclosure only signals the end of the tile bit and performs byte alignment only once after the last CTB 430 in CTB row 468 has been coded. In doing so, the number of signaling bits and the number of bits used as padding are reduced relative to WPP.

Figure 5:
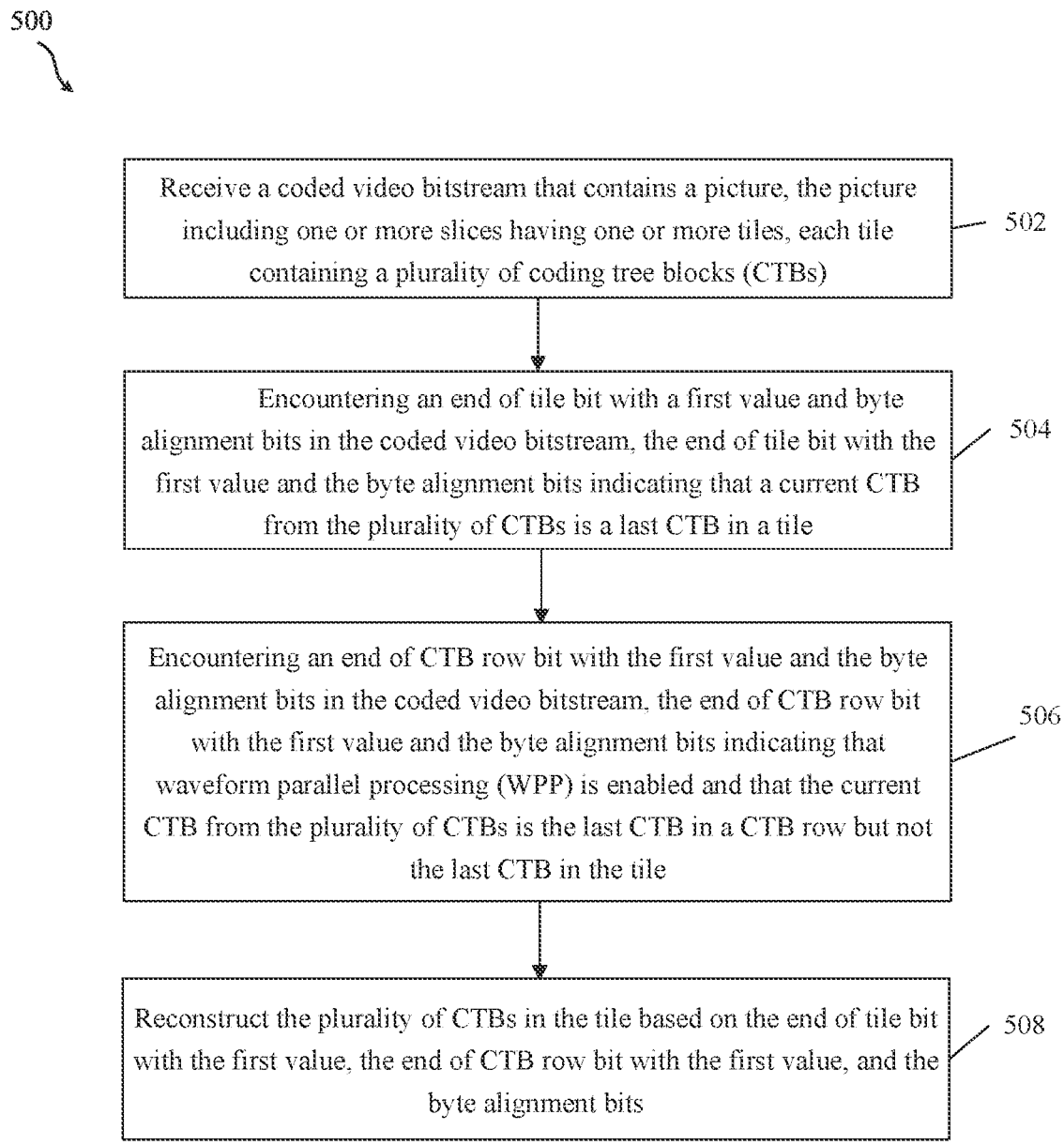
FIG. 5 is an embodiment of a method of decoding a coded video bitstream.

FIG. 5 is an embodiment of a method 500 of decoding a coded video bitstream implemented by a video decoder (e.g., video decoder 30). The method 500 may be performed after the decoded bitstream has been directly or indirectly received from a video encoder (e.g., video encoder 20). The method 500 improves the decoding process by reducing the number of signaling bits and the number of bits used as padding following coding of the last CTB (e.g., CTB 430) in last CTB row (e.g., CTB row 468) of a tile (e.g., tile 424). Therefore, as a practical matter, the performance of a codec is improved, which leads to a better user experience.

In block 502, the video decoder receives the coded video bitstream (e.g., bitstream 400). In an embodiment, the coded video bitstream contains a picture (e.g., picture 410). In an embodiment, the picture includes one or more slices (e.g., slices 416-420) having one or more tiles (e.g., tiles 422-426). In an embodiment, each tile contains a plurality of coding tree blocks (e.g., CTBs 428-430).

In block 504, the video decoder encounters an end of tile bit with a first value and byte alignment bits in the coded video bitstream. In an embodiment, the end of tile bit is designated end_of_tile_one_bit. In an embodiment, the first value is one (1). In an embodiment, the byte alignment bits are the result of a bit alignment process performed by an encoder (e.g., the video encoder 20). In an embodiment, the end of tile bit with the first value and the byte alignment bits indicate that a current CTB (e.g., CTB 430) from the plurality of CTBs (e.g., CTBs 428-430) is a last CTB in a tile (e.g., tile 424).

In block 506, the video decoder encounters an end of CTB row bit with the first value and the byte alignment bits in the coded video bitstream. In an embodiment, the video decoder encounters an end of CTB row bit with the first value and the byte alignment bits in the coded video bitstream when the end of tile bit with the first value is absent from the coded video bitstream. In an embodiment, the end of CTB row bit is designated end_of_subset_bit. In an embodiment, the first value is one (1). In an embodiment, the byte alignment bits are the result of a bit alignment process performed by an encoder (e.g., the video encoder 20). In an embodiment, the end of CTB row bit with the first value and the byte alignment bits indicate that WPP is enabled and that the current CTB (e.g., CTB 430) from the plurality of CTBs (e.g., CTBs 428-430) is the last CTB in a CTB row (e.g., CTB rows 460-466) but not the last CTB in the tile (e.g., tile 424).

In block 508, the video decoder reconstructs the plurality of CTBs in the tile based on the end of tile bit with the first value, the end of CTB row bit with the first value, and the byte alignment bits. In an embodiment, an image is generated based on the plurality of CTBs as reconstructed. In an embodiment, the image may be displayed for a user of an electronic device (e.g., a smart phone, tablet, laptop, personal computer, etc.).

Figure 6:
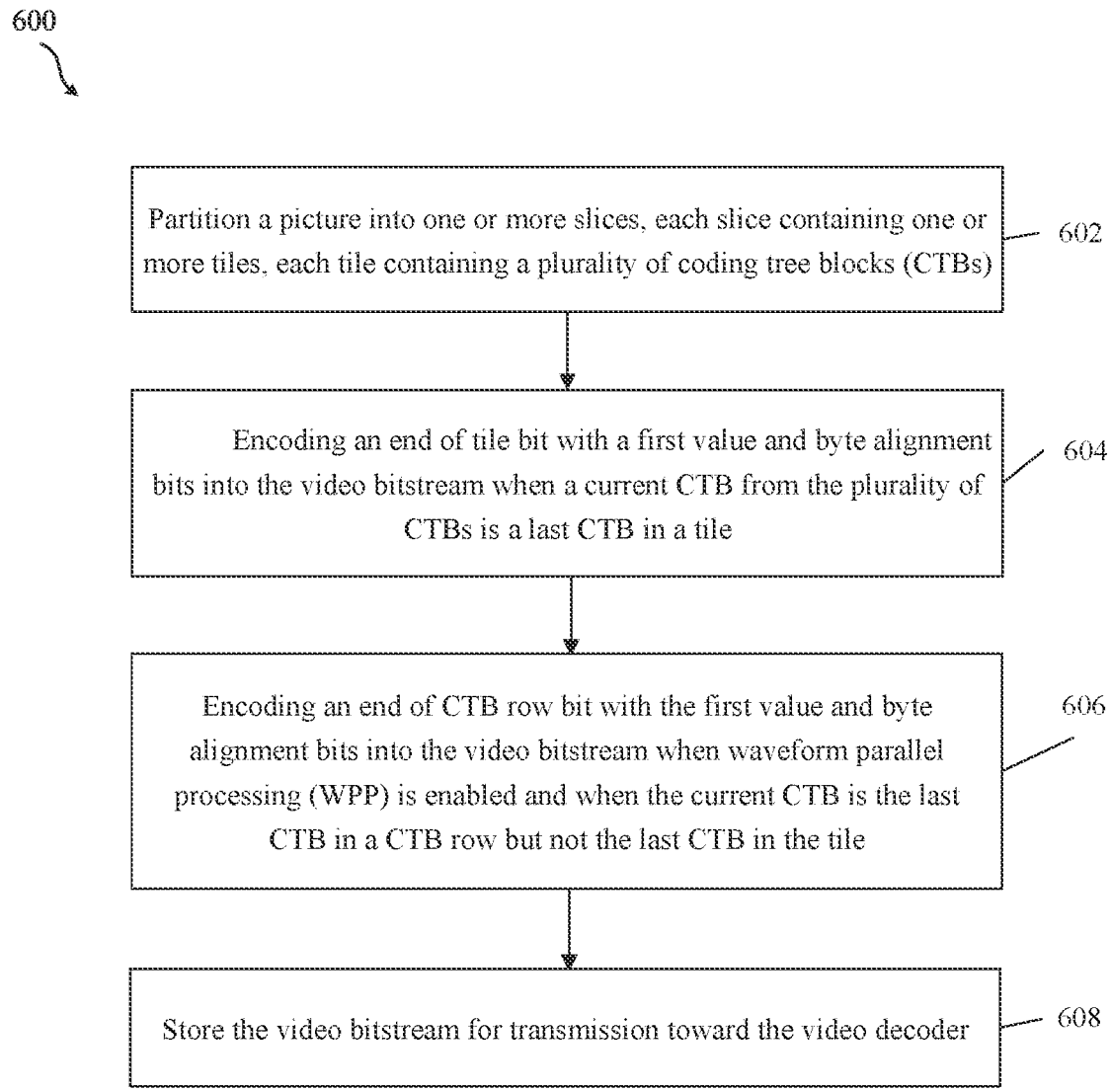
FIG. 6 is an embodiment of a method of encoding a coded video bitstream.

FIG. 6 is an embodiment of a method 600 of encoding a video bitstream implemented by a video encoder (e.g., video encoder 20). The method 600 may be performed when a picture (e.g., from a video) is to be encoded into a video bitstream and then transmitted toward a video decoder (e.g., video decoder 30). The method 600 improves the encoding process by reducing the number of signaling bits and the number of bits used as padding following coding of the last CTB (e.g., CTB 430) in last CTB row (e.g., CTB row 468) of a tile (e.g., tile 424). Therefore, as a practical matter, the performance of a codec is improved, which leads to a better user experience.

In block 602, the video encoder partitions a picture (e.g., picture 410) into one or more slices (e.g., slices 416-420). In an embodiment, each slice contains one or more tiles (e.g., tiles 422-426). In an embodiment, each tile contains a plurality of coding tree blocks (e.g., CTBs 428-430).

In block 604, the video encoder encodes an end of tile bit with a first value and byte alignment bits into the video bitstream when a current CTB from the plurality of CTBs is a last CTB in a tile. In an embodiment, the end of tile bit is designated end_of_tile_one_bit. In an embodiment, the first value is one (1). In an embodiment, the byte alignment bits are the result of a bit alignment process performed by the encoder (e.g., the video encoder 20). In an embodiment, the end of tile bit with the first value and the byte alignment bits indicate that a current CTB (e.g., CTB 430) from the plurality of CTBs (e.g., CTBs 428-430) is a last CTB in a tile (e.g., tile 424).

In block 606, the video encoder encodes an end of CTB row bit with the first value and byte alignment bits into the video bitstream when WPP is enabled and when the current CTB is the last CTB in a CTB row but not the last CTB in the tile. In an embodiment, the end of CTB row bit is designated end_of_subset_bit. In an embodiment, the first value is one (1). In an embodiment, the byte alignment bits are the result of a bit alignment process performed by the encoder (e.g., the video encoder 20). In an embodiment, the end of CTB row bit with the first value and the byte alignment bits indicate that WPP is enabled and that the current CTB (e.g., CTB 430) from the plurality of CTBs (e.g., CTBs 428-430) is the last CTB in a CTB row (e.g., CTB rows 460-466) but not the last CTB in the tile (e.g., tile 424).

In block 608, the video encoder stores the video bitstream for transmission toward the video decoder. In an embodiment, the video encoder transmits the video bitstream toward the video decoder.

The following syntax and semantics may be employed to implement the embodiments disclosed herein. The following description is relative to the basis text, which is the latest VVC draft specification. In other words, only the delta is described, while the texts in the basis text that are not mentioned below apply as they are. Added text relative to the basis text is shown in bold, and removed text is shown in italics.

Figure 7:
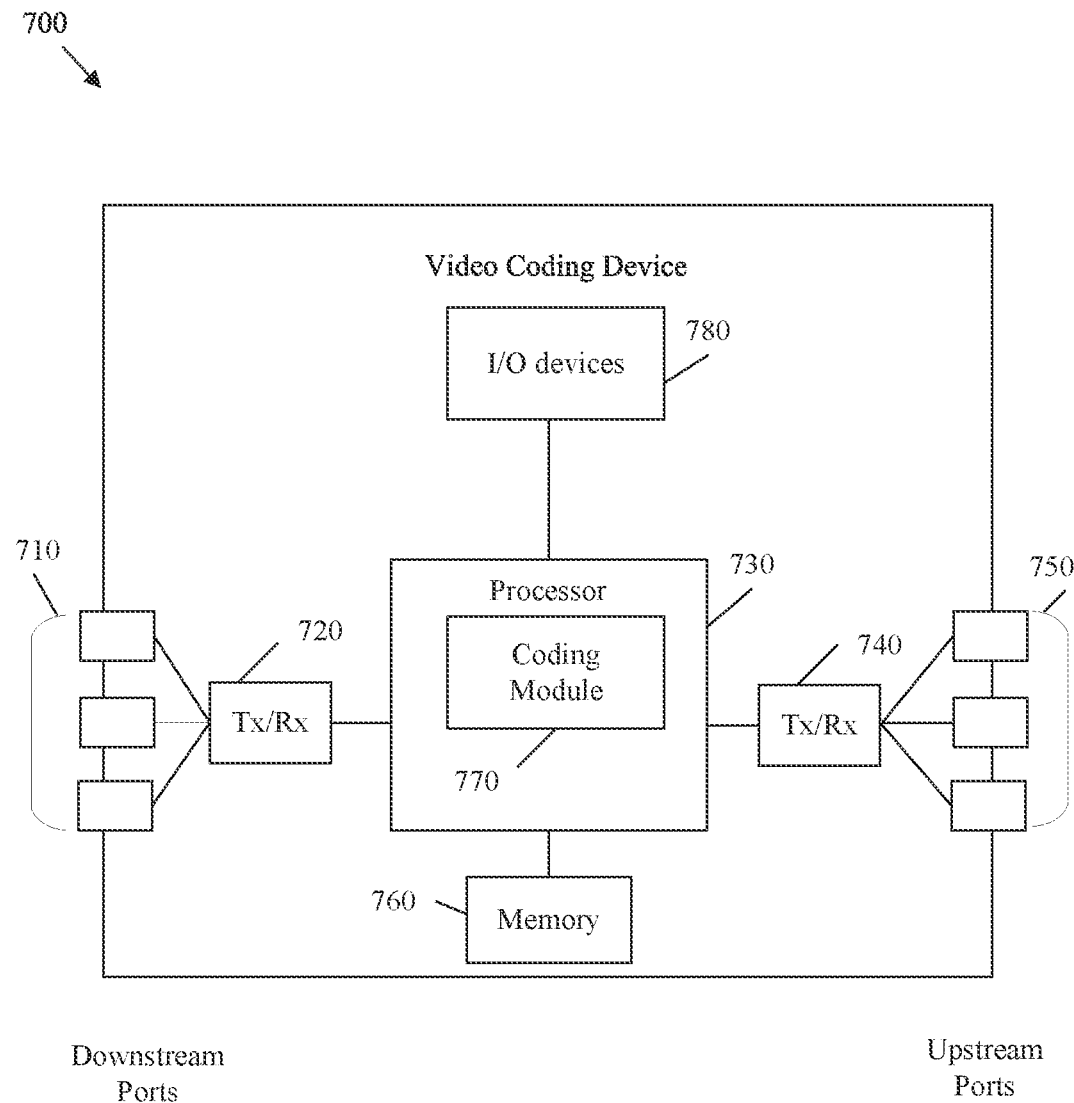
FIG. 7 is a schematic diagram of a video coding device.

FIG. 7 is a schematic diagram of a video coding device 700 (e.g., a video encoder 20 or a video decoder 30) according to an embodiment of the disclosure. The video coding device 700 is suitable for implementing the disclosed embodiments as described herein. The video coding device 700 comprises ingress ports 710 and receiver units (Rx) 720 for receiving data; a processor, logic unit, or central processing unit (CPU) 730 to process the data; transmitter units (Tx) 740 and egress ports 750 for transmitting the data; and a memory 760 for storing the data. The video coding device 700 may also comprise optical-to-electrical (OE) components and electrical-to-optical (EO) components coupled to the ingress ports 710, the receiver units 720, the transmitter units 740, and the egress ports 750 for egress or ingress of optical or electrical signals.

The processor 730 is implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 is in communication with the ingress ports 710, receiver units 720, transmitter units 740, egress ports 750, and memory 760. The processor 730 comprises a coding module 770. The coding module 770 implements the disclosed embodiments described above. For instance, the coding module 770 implements, processes, prepares, or provides the various codec functions. The inclusion of the coding module 770 therefore provides a substantial improvement to the functionality of the video coding device 700 and effects a transformation of the video coding device 700 to a different state. Alternatively, the coding module 770 is implemented as instructions stored in the memory 760 and executed by the processor 730.

The video coding device 700 may also include input and/or output (I/O) devices 780 for communicating data to and from a user. The I/O devices 780 may include output devices such as a display for displaying video data, speakers for outputting audio data, etc. The I/O devices 780 may also include input devices, such as a keyboard, mouse, trackball, etc., and/or corresponding interfaces for interacting with such output devices.

The memory 760 comprises one or more disks, tape drives, and solid-state drives and may be used as an overflow data storage device, to store programs when such programs are selected for execution, and to store instructions and data that are read during program execution. The memory 760 may be volatile and/or non-volatile and may be read-only memory (ROM), random access memory (RAM), ternary content-addressable memory (TCAM), and/or static random-access memory (SRAM).

Figure 8:
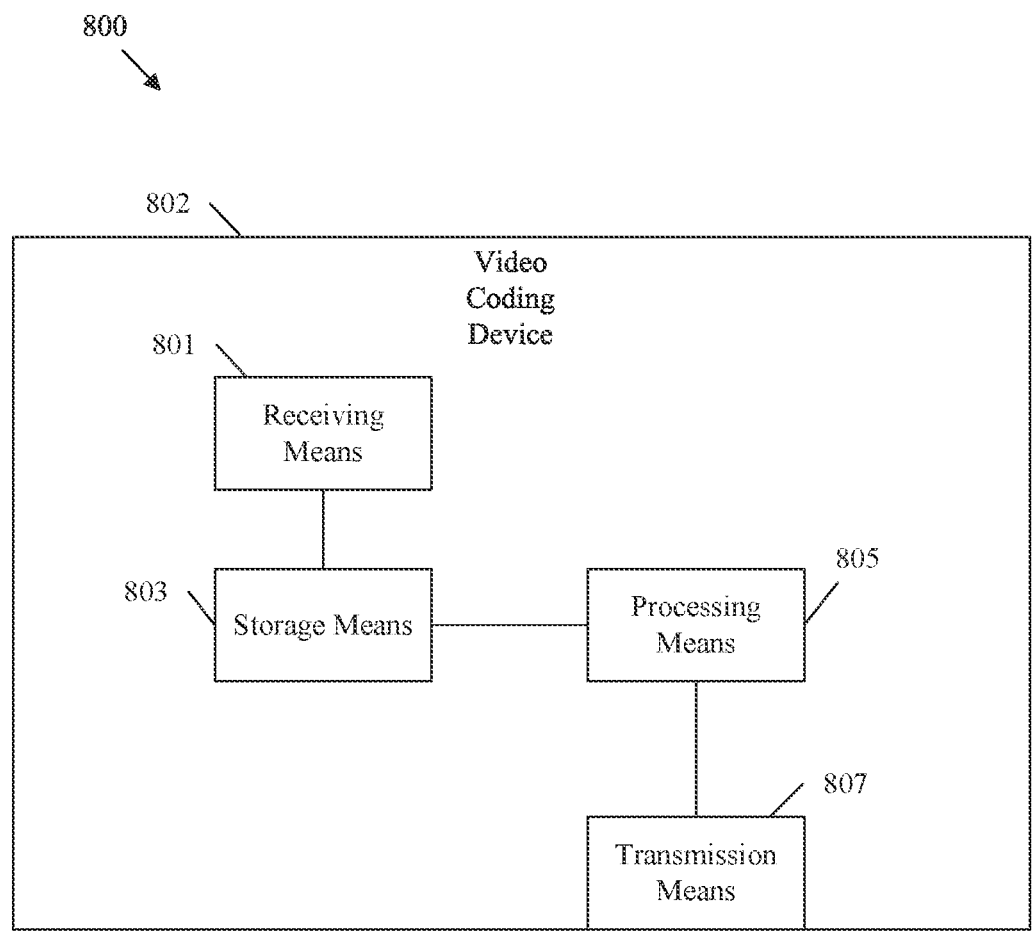
FIG. 8 is a schematic diagram of an embodiment of a means for coding.

FIG. 8 is a schematic diagram of an embodiment of a means for coding 800. In an embodiment, the means for coding 800 is implemented in a video coding device 802 (e.g., a video encoder 20 or a video decoder 30). The video coding device 802 includes receiving means 801. The receiving means 801 is configured to receive a picture to encode or to receive a bitstream to decode. The video coding device 802 includes transmission means 807 coupled to the receiving means 801. The transmission means 807 is configured to transmit the bitstream to a decoder or to transmit a decoded image to a display means (e.g., one of the I/O devices 780).

The video coding device 802 includes a storage means 803. The storage means 803 is coupled to at least one of the receiving means 801 or the transmission means 807. The storage means 803 is configured to store instructions. The video coding device 802 also includes processing means 805. The processing means 805 is coupled to the storage means 803. The processing means 805 is configured to execute the instructions stored in the storage means 803 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of decoding implemented by a video decoder, comprising:
   receiving a coded video bitstream, wherein the coded video bitstream contains coded data representing a picture, the picture including one or more slices having only one tile, each tile containing only one brick, and each brick containing a plurality of coding tree blocks (CTBs);
   parsing a parameter set to determine whether wavefront parallel processing is enabled for a current picture and/or for a current slice;
   parsing slice data of the current slice to obtain bricks and CTBs within each brick;
   parsing an end of brick bit with a first value and byte alignment bits in the coded video bitstream, the end of brick bit with the first value indicating that a current CTB from the plurality of CTBs is a last CTB in a brick;
   parsing an end of CTB row bit with the first value and the byte alignment bits in the coded video bitstream, the end of CTB row bit with the first value indicating that waveform parallel processing (WPP) is enabled and that the current CTB from the plurality of CTBs is the last CTB in a CTB row but not the last CTB in the brick; and
   reconstructing the plurality of CTBs in the brick based on the end of brick bit with the first value, the end of CTB row bit with the first value, and the byte alignment bits.

2. The method of claim 1, wherein the end of brick bit is designated end_of_brick_one_bit.

3. The method of claim 1, wherein the end of CTB row bit is designated end_of_subset_bit.

4. The method of claim 1, wherein the WPP is enabled by a flag disposed in a parameter set.

5. The method of claim 1, wherein the WPP is enabled by a flag designated as entropy_coding_sync_enabled_flag.

6. The method of claim 4, wherein the first value of the flag is one (1) when the WPP is enabled.

7. The method of claim 1, further comprising displaying an image generated based on the plurality of CTBs as reconstructed.

8. A method of encoding implemented by a video encoder, the method comprising:
   partitioning a picture into one or more slices, each slice containing only one tile, each tile containing only one brick, and each brick containing a plurality of coding tree blocks (CTBs);
   encoding a parameter set to determine whether wavefront parallel processing is enabled for a current picture and/or for a current slice;
   encoding slice data of the current slice to obtain bricks and CTUs within each brick;

encoding an end of brick bit with a first value and byte alignment bits into a video bitstream when a current CTB from the plurality of CTBs is a last CTB in a brick;

encoding an end of CTB row bit with the first value and byte alignment bits into the video bitstream when waveform parallel processing (WPP) is enabled and when the current CTB is the last CTB in a CTB row but not the last CTB in the brick.

9. The method of claim 8, wherein the end of brick bit is designated end_of_brick_one_bit.

10. The method of claim 8, wherein the end of CTB row bit is designated end_of_subset_bit.

11. The method of claim 8, wherein the WPP is enabled by a flag disposed in a parameter set.

12. The method of claim 8, wherein the WPP is enabled by a flag designated as entropy_coding_sync_enabled_flag.

13. The method of claim 11, wherein the first value of the flag is one (1) when the WPP is enabled.

14. The method of claim 8, further comprising transmitting the video bitstream toward a video decoder.

15. A non-transitory storage medium storing an encoded bitstream and one or more instructions executable by at least one processor to perform operations of encoding or decoding of the bitstream, the encoded bitstream being generated by dividing a frame of a video signal or an image signal into a plurality slices, and the operations comprising:

encoding coded data representing a picture, the picture including one or more slices having only one tile, each tile containing only one brick, and each brick containing a plurality of coding tree blocks (CTBs);

encoding a parameter set to determine whether wavefront parallel processing is enabled for a current picture and/or for a current slice;

encoding slice data of the current slice to obtain bricks and coding tree units (CTUs) within each brick;

encoding an end of brick bit with a first value and byte alignment bits in the encoded bitstream, the end of brick bit with the first value indicating that a current CTB from the plurality of CTBs is a last CTB in a brick; and encoding an end of CTB row bit with the first value and the byte alignment bits in the encoded bitstream, the end of CTB row bit with the first value indicating that waveform parallel processing (WPP) is enabled and that the current CTB from the plurality of CTBs is the last CTB in a CTB row but not the last CTB in the brick.

16. The non-transitory storage medium of claim 15, wherein the end of brick bit is designated end_of_brick_one_bit.

17. The non-transitory storage medium of claim 15, wherein the end of CTB row bit is designated end_of_subset_bit.

18. The non-transitory storage medium of claim 15, wherein the WPP is enabled by a flag disposed in a parameter set.

19. The non-transitory storage medium of claim 15, wherein the WPP is enabled by a flag designated as entropy_coding_sync_enabled_flag.

20. The non-transitory storage medium of claim 18, wherein the first value of the flag is one (1) when the WPP is enabled.

* * * * *

UNITED STATES PATENT AND TRADEMARK OFFICE
CERTIFICATE OF CORRECTION

| | |
|---|---|
| PATENT NO. | : 12,432,366 B2 |
| APPLICATION NO. | : 18/544091 |
| DATED | : September 30, 2025 |
| INVENTOR(S) | : Fnu Hendry et al. |

Page 1 of 1

It is certified that error appears in the above-identified patent and that said Letters Patent is hereby corrected as shown below:

On the Title Page

On Page 3, (56) References Cited, Other Publications:
Reference Document JVET-P2001-vE, delete "29/WVG 11" and insert -- 29/WG 11 --.

On Page, (56) References Cited, Other Publications:
Reference Ikai, T., et al., delete "29/WVG 11," and insert -- 29/WG 11, --.

Signed and Sealed this
Ninth Day of December, 2025

John A. Squires
*Director of the United States Patent and Trademark Office*